UNITED STATES PATENT OFFICE.

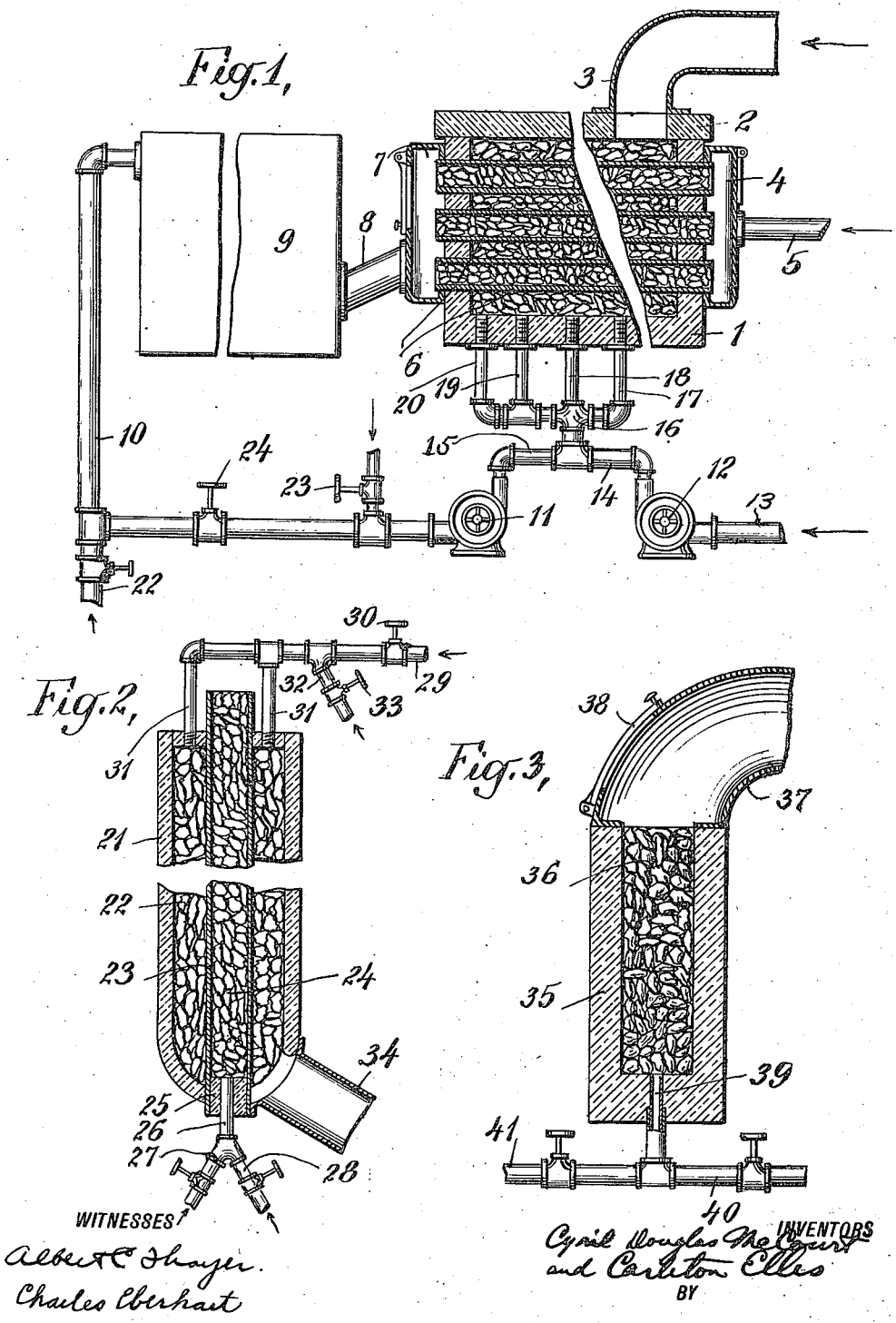

CYRIL DOUGLAS McCOURT, OF LONDON, ENGLAND, AND CARLETON ELLIS, OF MONTCLAIR, NEW JERSEY, ASSIGNORS, BY MESNE ASSIGNMENTS, TO SURFACE COMBUSTION, INC., OF WILMINGTON, DELAWARE, A CORPORATION OF DELAWARE.

PROCESS FOR MANUFACTURING GAS-BLACK, HYDROGEN, &c.

1,276,385.   Specification of Letters Patent.   Patented Aug. 20, 1918.

Application filed January 23, 1912. Serial No. 672,810.

*To all whom it may concern:*

Be it known that we, CYRIL DOUGLAS McCOURT, a subject of the King of Great Britain, and resident of 45 Braxted Park, Streatham Common, London, England, and CARLETON ELLIS, a citizen of the United States, and resident of Montclair, county of Essex, State of New Jersey, have made certain new and useful Improvements in Processes for Manufacturing Gas-Black, Hydrogen, and so forth, of which the following is a specification, taken in connection with the accompanying drawing, forming part of the same.

This invention relates to a process for manufacturing gasblack, hydrogen and so forth which comprises passing suitable carbureted or hydrocarbon gas such as natural gas, coal gas, etc., into a highly heated porous and permeable bed of refractory material in a tubular or other suitable chamber in a suitable furnace, the bed being heated to the high temperature of decomposition of such gas to effect the decomposition thereof into hydrogen and similar gas and suspended gasblack or carbon particles, which are discharged from the chamber containing the bed into a suitable separator, as hereinafter more fully described and as claimed. The decomposing bed is most desirably heated by the surface combustion of an explosive gaseous mixture of fuel and air or other combustion supporting gas in a porous and permeable bed of refractory material surrounding the tubular or other chamber containing the decomposition bed, hydrogen produced by the process and separated from the gasblack being desirably used as the fuel gas constituent of such explosive mixture.

In the accompanying drawing showing in a somewhat diagrammatic way several forms of apparatus for practising our process.

Figure 1 is an elevation partly in section of one form of apparatus.

Fig. 2 shows in vertical section another form of treating furnace; and

Fig. 3 is a sectional view of still another form of furnace.

In the illustrative form of apparatus shown in Fig. 1, the furnace 1 having walls of suitable refractory material may have arranged horizontally or otherwise therein a number of tubes 6 of heat conducting material of a suitable refractory character such as graphite, alumina or magnesia compositions. These tubes may be three or four inches or more in internal diameter and may be packed with granular refractory material such as calcined magnesite, fire-clay and so forth of any suitable size as for example of about one-half or one inch mesh. The admission casing 4 may be arranged in any desired way so as to communicate with the admission ends of these tubes and supply thereto suitable carbureted or hydrocarbon gases under the desired pressure through the admission pipe 5. A similar receiving casing 7 having a suitable inspection and cleaning door may be arranged in connection with the discharge ends of said tubes so as to receive the treated gaseous material discharged therefrom and lead the same through the separator pipe 8 into the separator 9 of any desired size and construction and provided with any suitable internal separating and collecting devices adapted to effect the separation of the suspended gasblack particles and the collection thereof while the hydrogen and similar gaseous material may be withdrawn from the separator through the fuel pipe 10 communicating with the gas pump 11. A suitable valved auxiliary supply pipe 22 may also communicate with the fuel pipe 10 so as to supply to the desired extent additional gaseous fuel to the gas pump. This pump forces the gas under the desired pressure of four to eight ounces more or less through the gas supply pipe 15 where it mixes with air under pressure supplied through the pipe 14 by the air pump 12 which may draw this air into the pipe 13. The air and gas are mixed in the pipes and header 16 in such proportions as to produce an explosive mixture, air being preferably present in amounts sufficient to insure the complete combustion of the gaseous fuel, and this explosive gaseous mixture is then forced through the injecting pipes 17, 18, 19 and 20 into contact with the granular refractory material packed around the treating tubes 6 within the furnace. The explosive gaseous mixture should be injected at such speed as to normally prevent backfiring and to effect the accelerated surface combustion of the gases within the granular material around the tubes which are thereby heated and then the subsequent passage of the combustion gases through additional portions of this granular material abstracts heat from the gases which is of course utilized for heating the other parts of the tubes before the combustion gases are finally discharged through a suitable discharge flue such as 3 arranged in the top or cover 2 of the furnace.

Gasblack, or carbon black, may be continuously manufactured in this way from natural gas and suitable amounts of other suitable combustible gas may be supplied as required through the auxiliary supply pipe 22 to start the operation or at other times, or if desired the excessive amounts of fuel gas produced by this treatment beyond that required to heat the treating tubes may be withdrawn from the fuel gas pipe through this pipe 22 or some similar connection. In some cases it is desirable to withdraw in this way through the pipe 22 the entire yield of hydrogen for use for instance in the manufacture of solid fats from more fluid fatty materials and to supply to the apparatus as through the valved inlet pipe 23 sufficient natural or other combustible gas to heat the tubes, the cut-off valve 24 being, of course, closed under these conditions. The gas pump 11 may be operated sufficiently to create a considerable suction in the separator and discharge end of the treating tubes which tends to promote the decomposition occurring therein of methane into a double volume of hydrogen and gasblack. The gas may however be forced into the admission pipe and through the treating tubes 6 at a suitable pressure of six or eight ounces more or less which is sufficient to overcome the internal resistance of the granular material in the treating tubes and assist in forcing the gaseous material through the separator. The accelerated surface combustion occurring on one side of the tubular or other partitions causes such high temperatures as to be amply sufficient to raise the material within the treating tubes to the decomposition temperatures for natural gas or the like and effect the conversion thereof into lampblack to the desired extent. The higher decomposition temperatures effect this chemical change in the methane in shorter times and by heating the tubes sufficiently and giving them sufficient length the methane can be directly and substantially completely converted into gasblack or suspended carbon particles and hydrogen before the material is discharged from the treating tubes. It is of course desirable to have the speed of the gaseous material within the tubes sufficient to prevent substantial deposition of the gasblack particles and these three factors of speed of the gaseous material and temperature and length of the treating tubes should be properly related to each other in order to secure the substantially complete conversion of methane into gasblack under these conditions as is specially desirable where the hydrogen is to be used for fat manufacture or other purposes. The gasblack produced from methane by this process is also highly desirable because it is intensely black in color and substantially free from the brownish lampblack products formed by the decomposition of the acetylenes and olefins producing inferior grades of lampblack.

As shown in Fig. 2 the treating tube or chamber may be heated by one or more internal heating tubes containing granular material heated by the surface combustion of suitable gaseous mixtures. The treating tube or chamber 21 may comprise a thick refractory lining to minimize radiation and have any desired form and sufficient length to secure the proper decomposition effects within the refractory granular material 22 packed or arranged therein and as indicated it is desirable to arrange this chamber in a substantially vertical position as indicated. Any desired number of heating tubes or units 23 may be arranged within the treating tube or chamber and packed to the desired extent with granular or other refractory combustion accelerating material 24 which may be heated by the injection and burning therein of explosive gaseous mixture. Each heating tube may be provided with a plug 25 at its inlet end with which the injecting pipe 26 may be connected so as to supply at speeds above those of backfiring explosive gaseous mixture through the valved air pipe 27 and the valved gas pipe 28 connected with sources of air and natural gas or other combustible gas under the desired pressure. The explosive gaseous mixture burns with accelerated combustion when injected into the granular refractory material in the heating tubes or units and highly heat the same in the combustion zone while the hot combustion gases passing through the upper portions of the tubes communicate heat thereto so that the surrounding granular material in the gas treating tube or chamber is heated to the desired high decomposition temperature, the temperature gradually increasing as the natural gas or other carbureted gas passes down through the treating tube.

The gas may be fed to the treating tube in any suitable way as by being supplied under sufficient pressure to force it through the treating tube at the desired rate through the gas admission pipe 29 provided with the regulating valve 30 and the gas may be led into the treating tube 21 through any desired number of pipes or connections 31. After passing down through the treating tube which has ample length to insure the contact of the natural gas or the like with the highly heated refractory material having gradually increasing temperatures so as to effect decomposition of the gas to the extent desired the hydrogen and suspended gasblack particles are conducted through a suitable pipe or passage 34 to any desired form of separator for effecting the separation of the hydrogen or other fuel gas from the suspended particles of gasblack. It is of course understood that the impregnated gaseous material may be separated by settling in suitable chambers, by straining through diaphragms or bags of canvas or other fabric or filtering material, while the last portions of the suspended carbonaceous particles may be removed by percolating the gaseous material through water containing the desired proportion of oily material to promote the aggregation of the carbonaceous particles into lumps for more convenient separation. In case of any undesirable collection of carbon within the treating chamber or tube it may be removed by injecting thereinto air or a suitable oxidizing mixture of explosive gases as by injecting the desired amount of air through the air pipe 32 provided with the valve 33 either alone or in connection with the desired amount of natural gas or other combustible gas supplied through the pipe 29.

From the foregoing description, it will be understood that the decomposition of the hydrocarbon gas in the treating chamber in accordance with the present invention is effected in the absence of air, and that the use of catalytic material in the treating chamber is unnecessary, the decomposition being most desirably effected in the absence of a catalyst.

It is not of course necessary that the conversion of the natural gas or the like should take place within the granular material arranged in tubes or chambers since it may be effected with equal facility in beds of granular material which may be heated in any desired way as by means of heating tubes containing granular material in which surface combustion of explosive gaseous material is effected or in other ways, such as illustrated in Fig. 3. In the form of apparatus there illustrated the furnace 35 is shown as containing a suitable amount of granular refractory material, 36 such as calcined magnesite, fireclay or the like adapted to cause accelerated surface combustion of explosive gaseous mixtures which may be fed thereto through any number of injecting pipes or passages 39 connected with the supply means 40, at such speed as to normally prevent backfiring. In this way the explosive gaseous mixture is burned within the granular material in a highly efficient manner and serves to highly heat the same. When the bed of material has been heated somewhat above the temperature required to decompose the carbureted gas employed, the supply of explosive gaseous mixture may be cut off and the carbureted gas such as natural gas, for instance, forced from the valved supply main 41 through the bed of highly heated granular material which decomposes the same into suspended carbon particles and hydrogen or similar gas which pass through the discharge flue 37 having the inspection door 38 to any suitable separating device. This action absorbs heat from the granular material and when it has cooled down to such extent as to lower the efficiency of transformation it may be again brought up to the desired temperature by the surface combustion therein of additional mixed gas and air.

Having described this invention in connection with a number of illustrative forms of apparatus, parts, proportions, materials, arrangements and steps, to the details of which disclosure the invention is not of course to be limited, what is claimed as new and what is desired to be secured by Letters Patent is set forth in the appended claims.

1. The process of producing gasblack which comprises forcing methane through a highly heated porous and permeable bed of refractory material and thereby decomposing the methane into gasblack and hydrogen, separating the gasblack from the hydrogen, and maintaining the temperature of the bed by heat developed by burning hydrogen so produced.

2. The process of producing gasblack and hydrogen which comprises forcing methane through a highly heated bed of granular refractory material in the absence of air or catalyst at a speed sufficient to prevent undesirable deposition of carbonaceous particles in the bed, and thereby decomposing the methane into gasblack and hydrogen.

3. The process of producing gasblack and hydrogen which comprises forcing methane through a highly heated porous and permeable bed of refractory material and thereby decomposing the methane into gasblack and hydrogen, the temperature of the bed increasing in the direction of flow therethrough and the flowing gas coming into contact with progressively hotter portions of the bed until the substantially complete decomposition of the methane into gasblack and hydrogen is effected.

4. The process of producing gasblack and hydrogen which comprises forcing methane continuously through a highly heated porous and permeable bed of refractory material and thereby decomposing the methane into gasblack and hydrogen, maintaining the temperature of the bed by heat developed by burning hydrogen so produced, and preventing entrance of the products of combustion into the decomposing bed.

5. The process of producing gasblack and hydrogen which comprises forcing methane continuously through a highly heated porous and permeable bed of refractory material and thereby decomposing the methane into gasblack and hydrogen, maintaining the temperature of the decomposing bed by the surface combustion of an explosive gaseous mixture adjacent the bed, and preventing the entrance of the products of combustion into said bed.

6. The process of making carbon black and hydrogen consisting in decomposing a suitable hydrocarbon by bringing it into contact with highly heated refractory material within an inclosing chamber in the absence of air or catalyst, and then separating the carbon from the hydrogen.

7. The process of making carbon black and hydrogen consisting in decomposing a suitable hydrocarbon by bringing it into contact with highly heated refractory material within an inclosing chamber in the absence of air or catalyst, and then cooling the decomposed elements to separate the carbon from the hydrogen.

CYRIL DOUGLAS McCOURT.
CARLETON ELLIS.

Witnesses:
HARRY H. DUNCAN,
JESSIE B. KAY.